United States Patent [19]

Collins et al.

[11] 4,452,601

[45] Jun. 5, 1984

[54] PROCESS FOR THE THERMAL STABILIZATION OF ACRYLIC FIBERS AND FILMS

[75] Inventors: George L. Collins, Maplewood; Norman W. Thomas, Warren, both of N.J.

[73] Assignee: Celanese Corporation, New York, N.Y.

[21] Appl. No.: 360,012

[22] Filed: Mar. 19, 1982

[51] Int. Cl.$^3$ ............................................. C01B 31/07
[52] U.S. Cl. .................................. 8/115.5; 264/29.2; 264/182; 423/447.5
[58] Field of Search ................. 264/182, 29.2; 8/115.5; 423/447.5

[56] References Cited

U.S. PATENT DOCUMENTS

| | | | |
|---|---|---|---|
| 3,242,124 | 3/1966 | Lower | 264/182 |
| 3,656,903 | 4/1972 | Stuetz | 423/447.5 |
| 3,852,401 | 12/1974 | Sukuki et al. | 264/182 |
| 3,923,950 | 12/1975 | Gump et al. | 264/182 |
| 4,002,426 | 1/1977 | Chenevey et al. | 264/182 |
| 4,233,163 | 11/1980 | McDonald | 8/115.5 |

FOREIGN PATENT DOCUMENTS

| | | | |
|---|---|---|---|
| 37-172 | 7/1962 | Japan | 264/182 |
| 42-15830 | 8/1967 | Japan | 264/182 |

*Primary Examiner*—Jay H. Woo
*Attorney, Agent, or Firm*—Burns, Doane, Swecker & Mathis

[57] ABSTRACT

An improved process for the thermal stabilization of an acrylic fibrous material or film is provided. A tetrasubstituted phosphonium salt which is capable of promoting the thermal stabilization is incorporated in a solution of the acrylic polymer prior to extruding the same to form a fibrous material or film, and the acrylic fibrous material or film having the tetrasubstituted phosphonium salt incorporated therein is heated in an oxygen-containing atmosphere until a thermally stabilized fibrous material or film is formed which is black in appearance, non-burning when subjected to an ordinary match flame and which is capable of undergoing carbonization. The presence of the tetrasubstituted phosphonium salt has been found to cause the thermal stabilization reaction to proceed at an accelerated rate.

18 Claims, No Drawings

PROCESS FOR THE THERMAL STABILIZATION OF ACRYLIC FIBERS AND FILMS

BACKGROUND OF THE INVENTION

In the past procedures have been proposed for the conversion of fibers and films formed from acrylic polymers to a modified form possessing enhanced thermal stability. Such modification has generally been accomplished by heating a fibrous material or film in an oxygen-containing atmosphere at a moderate temperature for an extended period of time.

U.S. Pat. Nos. 2,913,802 to Barnett, 3,285,696 to Tsunoda, and 3,539,295 to Ram disclose processes for the conversion of fibers of acrylonitrile homopolymers or copolymers to a heat resistant form. The stabilization of fibers of acrylonitrile homopolymers and copolymers in an oxygen-containing atmosphere involves (1) a chain scission and crosslinking reaction of adjoining molecules as well as (2) a cyclization reaction of pendant nitrile groups. It is generally recognized that the rate at which the stabilization reaction takes place increases with the temperature of the oxygen-containing atmosphere. However, the stabilization reaction must by necessity be conducted at least initially at relatively low temperatures (i.e., below about 300° C.), since the cyclization reaction is exothermic in nature and must be controlled if the original fibrous configuration of the material undergoing stabilization is to be preserved. Accordingly, the stabilization reaction tends to be time consuming, and economically demanding because of low productivity necessitated by the excessive time requirements. Prior processes which may shorten the period required by the stabilization reaction include those disclosed in U.S. Pat. Nos. 3,416,874, 3,592,595, 3,647,770, 3,650,668, 3,656,882, 3,656,883, 3,708,326, 3,729,549, 3,767,773, 3,813,219, 3,814,577, 3,820,951, 3,850,876, 3,917,776, 3,923,950, 3,961,888, 4,001,382, 4,002,426, and 4,004,053; British Pat. Nos. 1,280,850; 1,471,066; 1,478,775; and 1,578,094; and Soviet Author's Certificate No. 389,012.

The above-identified U.S. Pat. No. 4,001,382 and British Pat. Nos. 1,478,775; 1,471,066; and 1,578,094 contemplate the presence of ammonium salts in acrylic fibers during the heat treatment thereof.

While stabilized acrylic fibrous materials may be used directly in applications where a non-burning fiber is required, demands for the same have been increasingly presented by manufacturers of carbonized fibrous materials. Carbonized fibrous materials are commonly formed by heating a stabilized acrylic fibrous material in a non-oxidizing atmosphere such as nitrogen or argon, at a more highly elevated temperature. During the carbonization reaction elements such as nitrogen, oxygen, and hydrogen are substantially expelled. Accordingly, the term "carbonized" as used in the art commonly designates a material consisting of at least about 90 percent carbon by weight, and generally at least about 95 percent carbon by weight. Depending upon the conditions under which a carbonized fibrous material is processed, it may or may not contain graphitic carbon as determined by the characteristic x-ray diffraction pattern of graphite. See, for instance, commonly assigned U.S. Pat. Nos. 3,656,904, 3,723,605, 3,775,520, 3,900,556, and 3,954,950.

It is an object of the present invention to provide an improved process for forming thermally stabilized acrylic fibers and films.

It is an object of the present invention to provide an improved process for forming a thermally stabilized acrylic fibrous material or film which satisfactorily can be carried out on an accelerated basis and optionally at a lower stabilization temperature.

It is an object of the present invention to provide an improved process for forming thermally stabilized acrylic fibers and films in which the undesirable exothermic nature of the stabilization reaction is modified.

It is another object of the invention to provide an improved process for forming stabilized fibrous materials or films derived from acrylic polymers which results in a product which is suitable for carbonization, or carbonization and graphitization.

It is a further object of the invention to provide an improved process for forming stabilized fibrous materials or films derived from acrylic polymers which provides a product which may be carbonized to form a carbonized product in an improved yield.

These and other objects, as well as the scope, nature, and utilization of the invention will be apparent from the following detailed description and appended claims.

SUMMARY OF THE INVENTION

A process for the production of stabilized acrylic fibers and films which are capable of undergoing carbonization is provided comprising:

a. providing a solution consisting essentially of (1) an acrylic polymer selected from the group consisting of an acrylonitrile homopolymer and acrylonitrile copolymers containing at least about 85 mole percent of acrylonitrile units and up to about 15 mole percent of one or more monovinyl units copolymerized therewith, (2) about 0.5 to 10 percent by weight based upon the weight of the acrylic polymer of a tetrasubstituted phosphonium salt which is capable of promoting the stabilization of the acrylic polymer, and (3) a solvent for the acrylic polymer and the tetrasubstituted phosphonium salt selected from the group consisting of N,N-dimethylformamide, N,N-dimethylacetamide, dimethylsulfoxide, butyrolactone, and N-methyl-2-pyrrolidinone, with the acrylic polymer being present in the solution in a concentration of about 10 to 25 percent by weight based upon the weight of the solvent, b. extruding the solution through a shaped orifice via solution spinning to form an acrylic fibrous material or film having incorporated therein about 0.5 to 10 percent by weight based upon the weight of the acrylic polymer of the tetrasubstituted phosphonium salt which was initially present in the solution of step (a), and c. heating the acrylic fibrous material or film having about 0.5 to 10 percent by weight based upon the weight of the acrylic polymer of the tetrasubstituted phosphonium salt which was initially present in the solution of step (a) incorporated therein in an oxygen-containing atmosphere at a temperature of about 200° to 350° C., until a thermally stabilized fibrous material or film is formed which is black in appearance, non-burning when subjected to an ordinary match flame and which is capable of undergoing carbonization, with the thermal stabilization being conducted at an accelerated rate because of the presence of the tetrasubstituted phosphonium salt.

DESCRIPTION OF THE PREFERRED EMBODIMENTS

The acrylic polymer utilized as the starting material is formed primarily of recurring acrylonitrile units. For instance, the acrylic polymer should either be an acrylonitrile homopolymer of an acrylonitrile copolymer which contains not less than about 85 mole percent of acrylonitrile units and not more than about 15 mole percent of units derived from a monovinyl compound which is copolymerizable with acrylonitrile such as styrene, methyl acrylate, methyl methacrylate, vinyl acetate, vinyl chloride, vinylidene chloride, vinyl pyridine, and the like, or a plurality of such monomers.

The stabilization promoting agent employed in the process of the present invention is a tetrasubstituted phosphonium salt which is capable of accelerating the thermal stabilization and which is capable of dissolution in the solution of the acrylic polymer. Such tetrasubstituted phosphonium salt should not vaporize too readily during the course of the thermal stabilization reaction so as to become unavailable and thereby be incapable of modifying such reaction. Representative tetrasubstituted phosphonium salts suitable for use in the process of the present invention include tetraphenylphosphonium bromide, tetraphenylphosphonium chloride, (carboethyoxymethyl)triphenylphosphonium bromide, carboethoxymethyl)triphenylphosphonium chloride, phenacyltriphenylphosphonium bromide, phenacyltriphenylphosphonium chloride, acetonyltriphenylphosphonium bromide, acetonyltriphenylphosphonium chloride, benzyltriphenylphosphonium bromide, benzyltriphenylphosphonium chloride, bisxylenetriphenylphosphonium bromide, bisxylenetriphenylphosphonium chloride, tetrakis(2-cyanoethyl)phosphonium bromide, tetrakis(2-cyanoethyl)phosphonium chloride, and mixtures of the foregoing. The salt preferably is a halide salt such as a chloride or a bromide. In a particularly preferred embodiment the salt is a bromide, such as tetraphenylphosphonium bromide, which offers significant resistance to vaporization during the thermal stabilization reaction.

Suitable solvents which may be utilized in the present process are capable of dissolving both the acrylic polymer and the tetrasubstituted phosphonium salt. Representative organic solvents include N,N-dimethylformamide, N,N-dimethylacetamide, dimethyl sulfoxide, butyrolactone, and N-methyl-2-pyrrolidinone. Such solvents should be substantially dry but not necessarily anhydrous. The solvent should be capable of forming a stable dope with the polymer and tetrasubstituted phosphonium salt. The preferred solvents are those which are commonly utilized during the spinning of fibers from acrylonitrile homopolymers and copolymers. The particularly preferred solvent is N,N-dimethylacetamide.

The concentration of the acrylic polymer in the solvent may be varied widely, e.g. about 10 to 25 percent by weight based upon the weight of the solvent. Preferred concentrations range from 16 to 22 percent acrylic polymer based upon the weight of the solvent. Preferred inherent viscosities for the solution range from approximately 1.1 to 1.7 dl./g.

The tetrasubstituted phosphonium salt is present in the solution in a minor concentration, i.e., about 0.5 to 10 percent by weight based upon the weight of the acrylic polymer. The larger concentrations of tetrasubstituted phosphonium salt may be used with advantage in those embodiments wherein the solution is extruded into a coagulation bath wherein a portion of the tetrasubstituted phosphonium salt is removed and is not present within the resulting acrylic fibrous material or film.

In a preferred embodiment of the process the solution of acrylic polymer and tetrasubstituted phosphonium salt additionally contains 0.1 to 5.0 percent by weight based upon the total weight of the solution (0.5 to 2.0 percent in a particularly preferred embodiment) of lithium chloride dissolved therein. The incorporation of lithium chloride serves the function of lowering and preserving upon standing the viscosity of the solution. The desired solution fluidity and mobility for extrusion are accordingly efficiently maintained even upon the passage of time.

The solution of the acrylic polymer and tetrasubstituted phosphonium salt suitable for extrusion may be formed by any convenient technique. For instance, the acrylic polymer while in particulate form together with the tetrasubstituted phosphonium salt may be added to the solvent with stirring while maintained at about 50° to 90° C. It is recommended that any heating of the solution in excess of about 100° C. be of limited duration, i.e., no more than a few minutes in order to avoid undesirable reactions that could contribute to gelling or instability in the spinning dope.

The solution is preferably filtered such as by passage through a plate and frame press provided with an appropriate filtration medium, prior to extrusion in order to assure the removal of any extraneous solid matter which could possibly obstruct the extrusion orifice.

The solution containing the acrylic polymer and the tetrasubstituted phosphonium salt is extruded through a shaped orifice to form fibers or films by conventional solution spinning techniques (i.e., may be dry spun or wet spun). As is known in the art, dry spinning is commonly conducted by passing the solution through an opening of predetermined shape into a suitable evaporative atmosphere, and wet spinning is commonly conducted by passing the solution through an opening of predetermined shape into a suitable coagulation bath.

When wet spinning is utilized in the fiber or film forming step of the process, a coagulation bath is selected which is capable of preserving the requisite quantity of the tetrasubstituted phosphonium salt within the resulting fibrous material or film. More specifically, the bath preferably exhibits no propensity to leach out and dissolve the tetrasubstituted phosphonium salt below the minimum level required during subsequent heat treatment step (described hereafter). Such coagulation bath may inherently possess no substantial tendency to dissolve the stabilization promoting agent. Alternatively, the coagulation bath which is selected may have its inherent tendency to dissolve the stabilization promoting agent diminished by preliminary dissolving a substantial quantity of the tetrasubstituted phosphonium salt or other compound therein. A representative coagulation bath is a 50/50 mixture of N,N-dimethylacetamide and methanol. A preferred wet spinning technique is disclosed in commonly assigned U.S. Pat. No. 3,567,409.

The shaped orifice or spinneret utilized during the extrusion may contain a single hole through which a single filament is extruded, and preferably contains a plurality of holes whereby a plurality of filaments may be simultaneously extruded in yarn form. The spinneret preferably contains holes having a diameter of about 50 to 150 microns when producing relatively low denier fibers having an as-spun denier of about 8 to 24 denier per filament. Alternatively, acrylic films of relatively thin thickness, e.g., about 1 to 10 mils, may be formed, when the extrusion orifice is a rectangular slit.

The resulting as-spun fibrous material or film is preferably maintained in a continuous length configuration throughout the process. At an intermediate point prior to heat treatment (described hereafter) the fibrous material may alternatively be transformed into another fibrous assemblage, e.g., a tow, fabric, or yarn of greater total denier.

When the fibrous material is a continuous multifilament yarn, a twist may be imparted to the same to improve the handling characteristics. For instance, a twist of about 0.1 to 5 tpi (turns per inch), and preferably about 0.3 to 1.0 tpi may be utilized. Also a false twist may be used instead of or in addition to a real twist. Alternatively, one may select bundles of fibrous material which possess essentially no twist.

The fibrous material may be drawn in accordance with conventional techniques in order to improve its orientation. For instance, the fibrous material may be drawn by stretching while in contact with a hot shoe at a temperature of about 140° to 160° C. Additional representative drawing techniques are disclosed in U.S. Pat. Nos. 2,455,173; 2,948,581; and 3,122,412. It is recommended that fibrous materials prior to the heat treatment (described hereafter) be drawn to a single filament tenacity of at least about 3 grams per denier. If desired, however, the fibrous material may be more highly oriented, e.g., drawn up to a single filament tenacity of about 7.5 to 8 grams per denier, or more. In a preferred embodiment the as-spun fibers are drawn to a relatively fine denier of approximately 0.6 to 2.0, e.g., 0.7 to 1.7. Additionally, the acrylic films optionally may be either uniaxially or biaxially oriented prior to the heat treatment (described hereafter).

Immediately prior to the heat treatment step the acrylic fibrous material or film preferably contains the tetrasubstituted phosphonium salt incorporated therein in a concentration of about 0.1 to 10 percent by weight based upon the weight of the acrylic polymer and most preferably in concentration of about 2 to 6 percent by weight (e.g., 5 percent by weight) based upon the weight of the acrylic polymer.

The resulting acrylic fibrous material or film containing the tetrasubstituted phosphonium salt incorporated therein is heated in an oxygen-containing atmosphere at a temperature of about 200° to about 350° C. until a stabilized fibrous product or film is formed which retains its original configuration essentially intact and which is non-burning when subjected to an ordinary match flame. In a preferred embodiment of the process, the oxygen-containing atmosphere is air. Preferred temperatures for the oxygen-containing atmosphere range from about 250° to 350° C., and most preferably about 260° to 290° C. If desired, the fibrous material or film may be exposed to a temperature gradient wherein the temperature is progressively increased.

For best results, uniform contact during the stabilization reaction with molecular oxygen throughout all portions of the acrylic material is encouraged. Such uniform reaction conditions can best be accomplished by limiting the mass of fibrous material or film at any one location so that heat dissipation from within the interior of the same is not unduly impaired, and free access to molecular oxygen is provided. For instance, the acrylic fibrous material or film may be placed in the oxygen-containing atmosphere while wound upon a support to a limited thickness. In a preferred embodiment of the invention, the acrylic fibrous material or film is continuously passed in the direction of its length through the heated oxygen-containing atmosphere. For instance, a continuous length of the acrylic fibrous material or film may be passed through a circulating oven or the tube of a muffle furnace. The speed of passage through the heated oxygen-containing atmosphere will be determined by the size of the heating zone and the desired residence time. A particularly preferred continuous heat treatment is disclosed in commonly assigned U.S. Ser. No. 749,957, filed Aug. 5, 1968, now abandoned, which is herein incorporated by reference.

The period of time required to complete the stabilization reaction within the oxygen-containing atmosphere is generally inversely related to the temperature of the atmosphere, and is also influenced by the denier of the acrylic fibrous material or the thickness of the film undergoing treatment, and the concentration of molecular oxygen in the atmosphere. Treatment times in the oxygen-containing atmosphere accordingly commonly range from about 15 minutes to several hours. Regardless of the stabilization temperature selected within the range of about 200° to 350° C., the presence of the tetrasubstituted phosphonium salt within the acrylic fibrous material or film results in an accelerated stabilization reaction for a given temperature.

For instance, polyacrylonitrile homopolymer fibers of 1.7 denier per filament which incorporated tetraphenylphosphonium bromide in a concentration of only one percent by weight based upon the weight of the polymer have been examined in nitrogen by differential scanning calorimetry employing a DuPont Model 1090 thermal analysis system in the temperature scanning mode and the results compared with similar control fibers which lack the tetraphenylphosphonium bromide additive. In this mode of operation the instrument was programmed to scan the temperature range from 25° to 450° C. The output of the instrument in this mode was the magnitude of the characteristic exotherm of polyacrylonitrile materials which diminishes during the course of the stabilization reaction. The stabilization temperature of 265° C. was maintained for two and one-half hours, and the residual exotherm results are reported below during this period:

|  | Fiber Which Incorporated Tetraphenylphosphonium Bromide Salt | Fiber Control |
| --- | --- | --- |
| 1.0 hour | 250 J./g. | 275 J./g. |
| 1.5 hours | 130 J./g. | 240 J./g. |
| 2.0 hours | 100 J./g. | 145 J./g. |
| 2.5 hours | 65 J./g. | 75 J./g. |

The fiber was sufficiently stabilized to undergo carbonization after about 1.5 hours in spite of the fact that it contained only one percent by weight of tetraphenylphosphonium bromide. The control fiber required in excess of two hours of heating to achieve the same level of stabilization. Had a greater concentration of the tetraphenylphosphonium bromide been present in the acrylonitrile hompolymer then the desired thermal stabilization would have been accelerated even more. When the stabilization is conducted in an oxygen-containing atmosphere in accordance with the present invention, such stabilization is similarly accelerated. Also, the use of an oxygen-containing atmosphere instead of a nitrogen atmosphere contributes to the enhancement of the physical properties of the resulting stabilized acrylic fibers and films.

The stabilized acrylic fibrous materials or films formed in accordance with the present process are black in appearance, retain essentially the same configuration as exhibited prior to heat treatment, are non-burning when subjected to an ordinary match flame, commonly have a bound oxygen content of at least 7 (e.g., 7 to 12) percent by weight as determined by the Unterzaucher or other suitable analysis, and commonly contain from about 50 to 65 percent carbon by weight.

The theory whereby the tetrasubstituted phosphonium salt serves to accelerate the stabilization reaction is considered complex and incapable of simple explanation. It is believed, however, that the oxygen cross-linking and incorporation as well as the cyclization reaction are catalyzed and proceed at an accelerated rate.

Since the stabilization reaction is accelerated in the present process, one optionally may elect to carry out the stabilization reaction at a less severe temperature than heretofore commonly utilized. Under milder temperature conditions a more uniform stabilized product may be achieved in the absence of undue chain degradation.

The stabilized fibrous material resulting from the stabilization treatment of the present invention is suitable for use in applications where a fire resistant fibrous material is required. For instance, non-burning fabrics may be formed from the same. The stabilized film resulting from the stabilization treatment is suitable for use in applications where a fire resistant sheet material is required. As previously indicated, the stabilized acrylic fibrous materials and films are particularly suited for use as intermediates in the production of carbonized fibrous materials and films (e.g., by heating in a non-oxidizing atmosphere such as nitrogen, argon, or helium at a temperature of at least 1000° C. until a carbonized fibrous material or film is formed which contains at least 90 percent carbon by weight). Such amorphous carbon or graphitic carbon fibrous products may be incorporated in a binder or matrix to serve as a reinforcing medium. The carbon fibers may accordingly serve as a lightweight load bearing component in high performance composite structures which find particular utility in the aerospace industry. The carbonized films may be utilized in the formation of lightweight high temperature resistant laminates when incorporated in a matrix material (e.g., an epoxy resin).

The following examples are given as specific illustrations of the invention. It should be understood, however, that the invention is not limited to the specific details set forth in the examples.

EXAMPLE I

A solution of acrylic polymer is formed while employing N,N-dimethylacetamide as a solvent which is maintained at 50° C. Particulate acrylonitrile copolymer containing 98 mole percent acrylonitrile units and 2 mole percent methyl acrylate units is added to the solvent with stirring in a concentration of 22 percent by weight based upon the weight of N,N-dimethylacetamide, and tetraphenylphosphonium bromide is dissolved in the acrylic polymer solution with stirring in a concentration of 5 percent by weight based upon the weight of the acrylic polymer.

Following filtration, the solution is promptly elevated to 140° C. and is fed to a standard cup type spinneret having a circle of 10 holes each having a diameter of 10 microns. The jet temperature and the temperature of the dry spinning column into which the solution is extruded are maintained at 180° C. The spinning column contains circulating nitrogen which substantially evaporates the N,N-dimethylacetamide solvent. The resulting fibers possess a denier per filament of about 8, are subsequently washed to remove residual solvent, and are drawn at a draw ratio of about 5:1 by passage over a hot shoe at a temperature of about 140° C. to yield fibers having a denier of about 0.9, and a single filament tenacity of at least 3 grams per denier.

The resulting fibers contain tetraphenylphosphonium bromide incorporated therein in a concentration of about 5 percent by weight, and the pendant nitrile groups of the acrylonitrile units present therein are substantially uncyclized.

The fibrous material is next stabilized on a continuous basis by heating while continuously passing for 30 minutes in the direction of its length through a circulating air atmosphere provided in a circulating air furnace provided at 265° C.

The resulting stabilized fibrous material is black in appearance, flexible, has a textile-like hand, retains its original fibrous configuration essentially intact, is non-burning when subjected to an ordinary match flame, retains strength after glowing in a match flame, and has an oxygen content in excess of 10 percent by weight.

The stabilized acrylic fibers are capable of undergoing carbonization by passage for 2 minutes through a resistance heated furnace provided with a circulating nitrogen atmosphere at 1350° C.

In a control run, an identical sample of the acrylonitrile homopolymer fibrous material is passed through the circulating air furnace in an identical manner with the exception that it contains no tetraphenylphosphonium bromide. The resulting fibrous material still exhibits a substantial residual exotherm indicating that the stabilization reaction failed to progress to the level achieved in Example I wherein the tetraphenylphosphonium bromide serves to promote the same.

EXAMPLE II

Example I is substantially repeated with the exception that a stabilized film is formed instead of a stabilzied acrylic fibrous material. More specifically, the solution containing the acrylic copolymer and tetraphenylphosphonium bromide is extruded via a standard film extrusion procedure and is subsequently hot drawn to form a film having a thickness of 0.75 mil. During the thermal stabilization reaction sufficient tension is exerted upon the film to maintain a constant longitudinal dimension.

Although the invention has been described with preferred embodiments, it is to be understood that variations and modifications may be resorted to as will be apparent to those skilled in the art. Such variations and modifications are to be considered within the purview and scope of the claims appended hereto.

We claim:
1. A process for the production of stabilized acrylic fibers and films which are capable of undergoing carbonization comprising:
   a. providing a solution consisting essentially of (1) an acrylic polymer selected from the group consisting of an acrylonitrile homopolymer and acrylonitrile copolymers containing at least about 85 mole per- cent of acrylonitrile units and up to about 15 mole percent of one or more monovinyl units copolymerized therewith, (2) about 0.5 to 10 percent by weight based upon the weight of said acrylic polymer of a tetrasubstituted phosphonium salt which is capable of promoting the stabilization of the acrylic polymer, and (3) a solvent for said acrylic polymer and said tetrasubstituted phosphonium salt selected from the group consisting of N,N-dimethylformamide, N,N-dimethylacetamide, dimethylsulfoxide, butyrolactone, and N-methyl-2-pyrrolidinone, with said acrylic polymer being present in said solution in a concentration of about 10 to 25 percent by weight based upon the weight of said solvent, b. extruding said solution through a shaped orifice via solution spinning to form an acrylic fibrous material or film having incorporated therein about 0.5 to 10 percent by weight based upon the weight of said acrylic polymer of said tetrasubstituted phosphonium salt which was initially present in said solution of step (a), and c. heating said acrylic fibrous material or film having about 0.5 to 10 percent by weight based upon the weight of said acrylic polymer of said tetrasubstituted phosphonium salt which was initially present in said solution of step (a) incorporated therein in an oxygen-containing atmosphere at a temperature of about 200° to 350° C., until a thermally stabilized fibrous material or film is formed which is black in appearance, non-burning when subjected to an ordinary match flame and which is capable of undergoing carbonization, with said thermal stabilization being conducted at an accelerated rate because of the presence of said tetrasubstituted phosphonium salt.

2. A process according to claim 1 wherein said acrylic polymer present in said solution is an acrylonitrile homopolymer.

3. A process according to claim 1 wherein said acrylic polymer present in said solution is an acrylonitrile copolymer containing at least about 85 mole percent of acrylonitrile units and up to about 15 mole percent of one or more monovinyl units copolymerized therewith.

4. A process according to claim 1 wherein said tetrasubstituted phosphonium salt is a halide selected from the group consisting of a bromide, a chloride, or mixtures thereof.

5. A process according to claim 1 wherein said tetrasubstituted phosphonium salt is a bromide.

6. A process according to claim 1 wherein said tetrasubstituted phosphonium salt is selected from the group consisting of tetraphenylphosphonium bromide, tetraphenylphosphonium chloride, (carboethyoxymethyl)triphenylphosphonium bromide, (carboethyoxymethyl)triphenylphosphonium chloride, phenacyltriphenylphosphonium bromide, phenacyltriphenylphosphonium chloride, phenacyltriphenylphosphonium chloride, acetonyltriphenylphosphonium bromide, acetonyltriphenylphosphonium chloride, benzyltriphenylphosphonium bromide, benzyltriphenylphosphonium chloride, bisxylenetriphenylphosphonium bromide, bisxylenetriphenylphosphonium chloride, tetrakis(2-cyanoethyl)phosphonium bromide, tetrakis(2-cyanoethyl) phosphonium chloride, and mixtures of the foregoing.

7. A process according to claim 1 wherein said tetrasubstituted phosphonium salt is tetraphenylphosphonium bromide.

8. A process according to claim 1 wherein said solvent is N,N-dimethylacetamide

9. A process according to claim 1 wherein said tetrasubstituted phosphonium salt is present in said solution in a concentration of about 0.5 to 10 percent by weight based upon the weight of said acrylic polymer.

10. A process according to claim 1 wherein said solution is extruded through a shaped orifice to form a fibrous material.

11. A process according to claim 10 wherein said fibrous material is drawn to a single filament tenacity of at least about 3 grams per denier prior to heating in said oxygen-containing atmosphere.

12. A process according to claim 11 wherein said acrylic fibrous material is a continuous multifilament yarn.

13. A process according to claim 1 wherein said solution is extruded through a shaped orifice to form a film.

14. A process according to claim 1 wherein said acrylic fibrous material or film contains said tetrasubstituted phosphonium salt in a concentration of about 2 to 6 percent by weight immediately prior to heating in said oxygen-containing atmosphere.

15. A process according to claim 1 wherein said oxygen-containing atmosphere is air and said fibrous material or film having tetrasubstituted phosphonium salt incorporated therein is heated by the continuous passage therethrough in the direction of its length.

16. A process according to claim 1 wherein said oxygen-containing atmosphere is maintained at a temperature of about 260° to 290° C.

17. A process according to claim 1 wherein said oxygen-containing atmosphere is air.

18. A process according to claim 1 which includes the additional step of heating said resulting thermally stabilized acrylic fibrous material or film in a non-oxidizing atmosphere at a temperature of at least 1000° C. until a carbonized fibrous material or film is formed which contains at least 90 percent carbon by weight.

* * * * *